Feb. 10, 1970     O. W. MOUSSETTE     3,494,196

ELECTRONIC THERMOMETER

Filed Sept. 13, 1967

INVENTOR.
OLIVER W. MOUSSETTE
BY Auske & Rothstein

ATTORNEYS

United States Patent Office 3,494,196
Patented Feb. 10, 1970

3,494,196
ELECTRONIC THERMOMETER
Oliver W. Moussette, New York, N.Y., assignor to Molasky Electronics, Inc., New York, N.Y., a corporation of New York
Filed Sept. 13, 1967, Ser. No. 667,501
Int. Cl. G01k 5/18, 5/52, 5/72
U.S. Cl. 73—362                                                4 Claims

ABSTRACT OF THE DISCLOSURE

An electronic clinical thermometer having a thermistor probe in one arm of a Wheatstone bridge, and a manually controlled potentiometer in another arm of the bridge. Depending on the polarity of the bridge output, i.e., the direction of unbalance, a respective one of two indicator lamps is energized to inform the user to move the manual balance control in one of two directions. When balance is achieved both lamps are de-energized. The manual control also directly moves a temperature scale, the reading of which gives an indication of the measured temperature when balance is achieved. A third lamp, below the scale, lights up when balance is achieved both to verify the balanced condition and to facilitate reading of the scale.

---

This invention relates to electronic thermometers, and more particularly to such thermometers which can be manufactured at a cost sufficiently low to permit them to be marketed for widespread home use.

Many suggestions have been made in the prior art with respect to the design of electronic thermometers. In most cases, a thermistor probe is provided for insertion into the patient's mouth. The resistance of the probe varies in accordance with the temperature and a meter of some kind, controlled by current through the resistance, may be provided for read-out purposes. In some prior art arrangements of this type a galvanometer is employed as the read-out mechanism, the galvanometer movement being controlled by the varying impedance of the probe. Inasmuch as galvanometers are relatively expensive, however, they are impractical for use in low-cost devices.

In other prior art arrangements a Wheatstone bridge is employed in which the thermistor probe is connected in one arm of the bridge. Typically, a motor is utilized to adjust the impedance of another arm of the bridge as the impedance of the probe varies, until the bridge is balanced. The direction of the motor, which typically controls movement of a potentiometer tap, is determined by the polarity of the bridge output. A visual indicator may be tied to the potentiometer control such that when balance is achieved the read-out represents the temperature measured. The difficulty with these prior art arrangements is that they too are relatively expensive because of the use of a motor.

Although it would appear that the latter type arrangement could be incorporated in a relatively low-cost device were the potentiometer movement controlled by the user rather than by a motor, there are difficulties with this approach as well. For example, the apparatus should be simple to use, that is, the ordinary consumer should be capable of operating it as well as a skilled technician. Moreover, even skilled persons might find it difficult to balance the bridge; excessive movement of the potentiometer might unbalance the bridge in the opposite direction.

It is a general object of this invention to provide an electronic thermometer which is both simple to operate, and of minimal complexity and cost.

Other objects of this invention include the provision of an electronic thermometer of the bridge-type which is relatively stable over a wide ambient temperature range, is capable of providing a reading in a few seconds, and is of small size.

Briefly, in accordance with the principles of my invention the thermistor probe is included in one arm of a Wheatstone bridge. In another arm of the bridge is a potentiometer controlled by a thumb wheel. The output of the bridge causes one of two lamps to be energized depending upon the polarity of the bridge unbalance. Each of the lamps is placed below an arrow indicator adjacent the thumb wheel. Depending upon which arrow indicator is lighted, the operator moves the thumb wheel in the respective direction. This adjusts the potentiometer to balance the bridge. If the operator overshoots the balance position, the other lamp indicator is energized to inform him to turn the thumb wheel in the other direction. When a balanced condition is achieved, both lamps turn off and a third lamp lights up to indicate that the bridge is balanced. The thumb wheel-controlled potentiometer is geared to a moving scale which represents the measured temperature. Any change in temperature causes the third light to turn off and one of the other two to turn on, thereby informing the operator that the bridge must be rebalanced in the indicated direction.

It is a feature of this invention to provide a thermistor probe in one arm of a Wheatstone bridge, the output polarity of the bridge causing a visual indication of the direction of unbalance in the bridge.

It is another feature of this invention to provide a manually controlled variable impedance in the bridge, the required direction of movement to balance the bridge being indicated by the energized one of two lamps.

It is still a further feature of this invention to provide a read-out mechanism coupled to the variable impedance, and a third lamp responsive to the balance of the bridge for indicating that the read-out represents the temperature to be measured.

Further objects, features and advantages of the invention will become apparent upon consideration of the following detailed description in conjunction with the drawing, in which.

Figure 1:
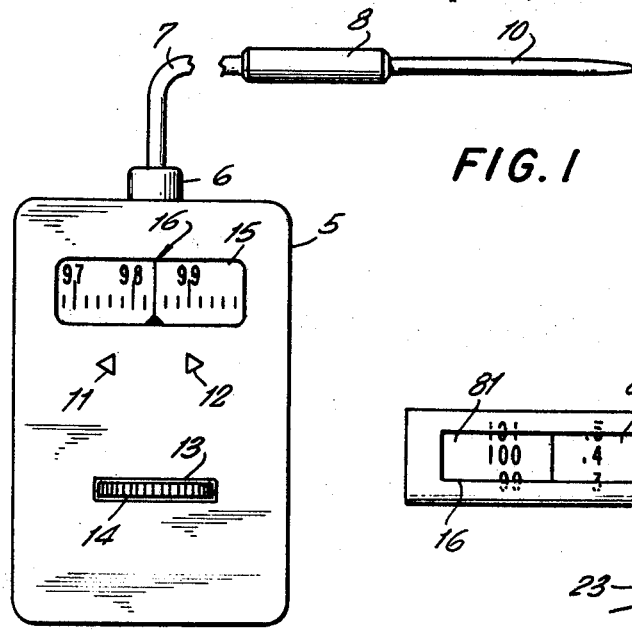
FIG. 1 depicts the front view of an illustrative electronic thermometer constructed in accordance with the principles of the invention.

The thermometer of FIG. 1 includes a case 5 having the approximate dimensions of a pack of cigarettes. Flexible tube 7 is connected to the case by coupler 6. Tube 7 is connected to gripping element 8 from which thermistor probe 10 extends. Inside probe 10 is a thermistor element whose resistance varies in accordance with the temperature around the probe, e.g., the temperature of the patient's mouth. The two ends of the thermistor element in probe 10 are connected to two respective wires, both of which are extended through gripping element 8, tube 7 and coupler 6 to the inside of case 5.

The case itself includes a window 16 made of transparent material with an indicator line down the center of it. Behind the window is a scale 15 which is movable from left to right and vice versa. As shown in the drawing, the instrument reads 98.4 degrees. Underneath window 16 is an opening 13 from which thumb wheel 14 protrudes. As the thumb wheel is turned by the user scale 15 moves in the same direction.

Between window 16 and thumb wheel 14 are two indicator arrows 11 and 12. A miniature lamp is disposed below each of these arrows. When arrow 11 lights up it is an indication to the user that thumb wheel 14 should be turned to the left. Although the user is unaware of this, movement of the thumb wheel to the left tends to balance the Wheatstone bridge inside the case. When indicator 12 lights up, the user is informed to turn the thumb wheel in the opposite direction. If the thumb wheel is turned too far the energized lamp will turn off and the other lamp will turn on. The user simply positions the thumb wheel such that neither of the indicator lamps is energized. At this time the bridge inside the case is balanced and the temperature reading on scale 15 at the center of window 16 indicates the temperature being measured.

In the illustrative embodiment of the invention a third lamp is provided inside the case below scale 15, the scale being translucent. This third lamp lights only when both indicators 11 and 12 turn off, i.e., when the bridge is balanced. In addition to providing another indication to the user that the proper reading has been obtained. The third lamp facilitates reading of the scale in a relatively dark room.

Figure 2:
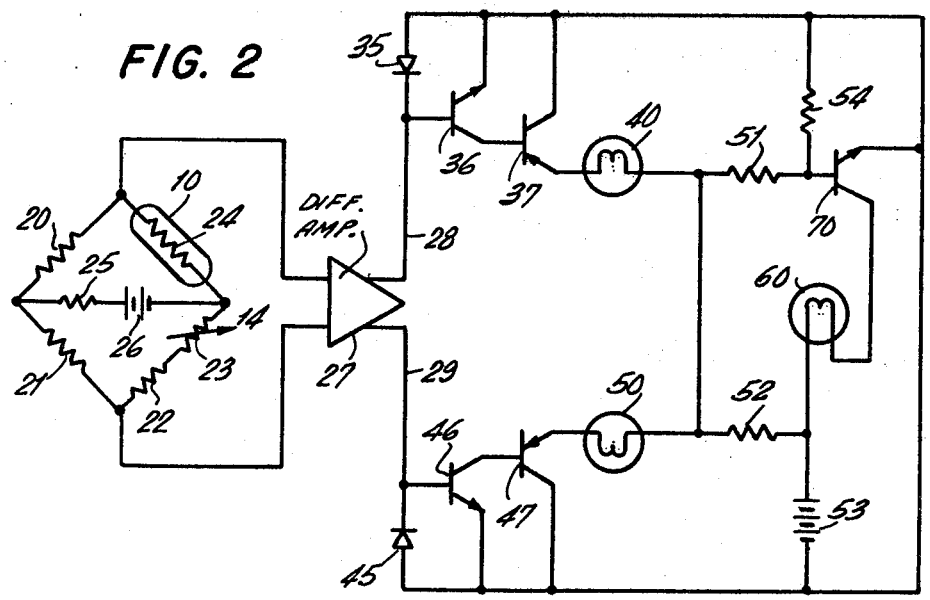
FIG. 2 depicts schematically the circuitry included inside the case of FIG. 1.

In the schematic of FIG. 2, thermistor probe 10 is shown as one element in a Wheatstone bridge. The thermistor impedance 24 varies in accordance with the temperature being measured. State of the art thermistors have responses which are so fast that it is possible to obtain an accurate temperature reading in a few seconds with the use of the apparatus disclosed in FIGS. 1 and 2.

Resistors 20–24 comprise the four arms of the bridge, one arm including both fixed resistor 22 and variable resistor 23. The magnitude of resistor 23 varies in accordance with the turning of thumb wheel 14 as indicated symbolically in the drawing.

Battery 26 and resistor 25 are connected across two opposite terminals of the bridge. The two output terminals, at the junctions of resistors 20 and 24, and 21 and 22, are connected to the input of differential amplifier 27. Resistors 20 and 21 are equal in magnitude. When the magnitude of resistor 24 equals the combined magnitudes of resistors 22 and 23 the bridge is balanced and there is no output. With a change of temperature, however, the magnitude of resistor 24 changes and it is necessary to adjust resistor 23 to balance the bridge. If the magnitude of resistor 23 is too low, the bridge output has one polarity; if the magnitude of resistor 23 is too high, the bridge output has the opposite polarity.

The function of differential amplifier 27 is to energize one of lamps 40 and 50 when the bridge is unbalanced. If the impedance of resistor 23 is too low, output conductor 28 is positive with respect to output conductor 29, lamp 40 is energized to light up the respective indicator arrow 11 and the user is informed to turn thumb wheel 14 to the left—this direction being that required to increase the magnitude of resistor 23 to bring the bridge back into balance. Similarly, if the impedance of resistor 23 is too high, input conductor 29 is positive with respect to conductor 28, lamp 50 is energized, and indicator arrow 12 lights up to inform the user to turn the thumb wheel to the right.

The emitter terminal of transistor 46 is connected to the negative terminal of battery 53. If conductor 29 is positive with respect to conductor 28 the base-emitter junction of transistor 46 is forward biased, current flowing from conductor 29 through the junction and diode 35 to conductor 28. With transistor 46 turned on transistor 47 conducts, current flowing from battery 53 through resistor 52, lamp 50 and the transistor. Only lamp 50 is energized. Lamp 40 remains off because transistors 36 and 37 do not conduct.

Similarly, if conductor 28 is positive with respect to conductor 29, transistors 36 and 37 conduct. Current flows from battery 53 through resistor 52, lamp 40, and the emitter and collector terminals of transistor 37 back to the battery. Current also flows from conductor 28 through the base-emitter junction of transistor 36 and diode 45 to conductor 29. Since neither of transistors 46 and 47 conducts, lamp 50 remains de-energized.

When either of lamps 40 and 50 conducts, lamp 60 remains off. With either pair of transistors 36, 37 or 46, 47 conducting, the junction of resistors 51 and 52 is connected to the negative terminal of battery 53 through one of the lamps and a conducting transistor. The impedance of the conducting transistor is negligible and that of the energized lamp is very small. The negative terminal of battery 53 is connected to the emitter of transistor 70. The positive terminal of the battery is coupled through a resistor network to the base of transistor 70. The magnitude of resistor 52 is very large compared to the negligible impedance of the series circuit comprising the energized lamp and the conducting one of transistors 37 and 47. Consequently, the voltage extended to the base of transistor 70 is very small compared to the magnitude of source 53 and the base-emitter junction of transistor 70 is not forward biased. Transistor 70 not conducting, lamp 60 remains off.

When the bridge is balanced, however, both of transistors 37 and 47 are non-conducting since there is no output from differential amplifier 27. In such a case, the voltage drop across resistors 51 and 54 is much greater since these resistors are not shorted by a low impedance lamp-transistor path. The base potential of transistor 70 is high enough to forward bias the transistor. Current flows from source 53 through lamp 60, and the collector and emitter terminals of transistor 70. When lamp 60 turns on the bridge balance is verified. With the lamp placed below scale 15, it serves the additional function of providing illumination so that the mechanism can be used in a dark room.

Although not shown in the drawing, an on/off switch may be provided, as is known in the art, to prevent drain of batteries 26 and 53.

Figure 3:
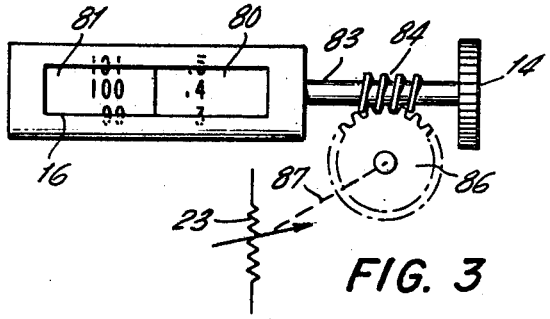
FIG. 3 depicts an alternative read-out mechanism which can be employed in the electronic thermometer of FIGS. 1 and 2.

In the embodiment of FIGS. 1 and 2, scale 15 moves from left to right and vice versa as thumb wheel 14 is turned. The temperature is determined by reading the value on the scale beneath the indicator line on window 15. In the modification of FIG. 3 a direct digital read-out is provided. Two drums 80 and 81 are provided beneath window 16. Drum 80 has the values .0–.9 around its periphery, and drum 81 has the values 96–106 around its periphery. As thumb wheel 14 is turned, shaft 83 turns drum 80. The gear ratio between drums 80 and 81 is 10:1 as is known in the art. Thus, a direct digital read-out may be obtained. Worm gear 84 is included on shaft 83 to control the turning of gear 86. This gear, in turn, through a mechanical connection shown only symbolically at 87, adjusts the magnitude of resistor 23 to bring the bridge back into balance.

The invention is advantageous in numerous respects. The instrument can be made at minimal cost because it does not include a galvanometer movement or a motor. Nevertheless, it is very simple to operate. The system is unaffected by battery non-uniformity and aging effects. The transistor circuitry is stable under a wide ambient temperature range. Accurate and reliable temperature measurements may be made in a matter of seconds. Continuous monitoring is possible. The battery power drain is very small and the instrument can be used with great frequency without having to replace batteries for many months at a stretch.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What is claimed is:

1. An electronic thermometer comprising a thermistor probe, a bridge network including said probe, a variable impedance in said bridge network, manual control means movable in two directions for adjusting the magnitude of said variable impedance in said bridge, first and second lamps each for indicating a required movement of said manual control means in a respective one of said two directions to achieve bridge balance, means responsive to the output of said bridge network for energizing one of said two lamps in accordance with the polarity of said output, read-out means coupled to said manual control means for representing the temperature of said thermistor probe when said bridge network is balanced, a third lamp, and means for energizing said third lamp only responsive to the deenergizations of both said first and second lamps.

2. An electronic thermometer in accordance with claim 1 wherein said third lamp is disposed below said read-out means and said read-out means is a movable scale made of translucent material.

3. An electronic thermometer comprising a thermistor probe, a variable impedance, manual control means movable in two directions for adjusting the magnitude of said variable impedance, means for comparing the magnitude of said variable impedance with the impedance of said thermistor probe, first and second means for indicating a required movement of said manual control means in a respective one of said two directions, means responsive to said comparing means for energizing one of said first and second indicating means in accordance with the difference between the impedance magnitudes of said thermistor probe and said variable impedance, read-out means responsive to said manual control means for representing the temperature of said thermistor probe, and third indicating means responsive to the de-energization of both said first and second indicating means for illuminating said read-out means.

4. An electronic thermometer comprising a thermistor probe, a variable impedance, manual control means movable in two directions for adjusting the magnitude of said variable impedance, means for comparing the magnitude of said variable impedance with the impedance of said thermistor probe, first and second means for indicating a required movement of said manual control means in a respective one of said two directions, means responsive to said comparing means for energizing one of said first and second indicating means in accordance with the difference between the impedance magnitudes of said thermistor probe and said variable impedance, read-out means responsive to said manual control means for representing the temperature of said thermistor probe, and third indicating means responsive to the de-energization of both said first and second indicating means for indicating achievement of a proper temperature read-out.

References Cited

UNITED STATES PATENTS

| | | |
|---|---|---|
| 1,099,199 | 6/1914 | Parker _____ 73—355 |
| 1,603,210 | 10/1926 | Pohl. |
| 2,672,880 | 3/1954 | Hermanson. |
| 2,859,402 | 11/1958 | Schaeve. |
| 3,184,728 | 5/1965 | Hart et al. |
| 3,339,414 | 9/1967 | Coor. |
| 3,348,415 | 10/1967 | Ash. |

LOUIS R. PRINCE, Primary Examiner

FREDERICK SHOON, Assistant Examiner

U.S. Cl. X.R.

340—228, 233